(12) United States Patent
Sato et al.

(10) Patent No.: US 9,961,711 B2
(45) Date of Patent: May 1, 2018

(54) CONTROL DEVICE TO CONTROL DIRECT COMMUNICATION AMONG COMMUNICATION TERMINALS

(71) Applicant: SONY CORPORATION, Tokyo (JP)

(72) Inventors: Masanori Sato, Tokyo (JP); Katsutoshi Itoh, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 14/905,822

(22) PCT Filed: Jul. 11, 2014

(86) PCT No.: PCT/JP2014/068637
§ 371 (c)(1),
(2) Date: Jan. 17, 2016

(87) PCT Pub. No.: WO2015/008712
PCT Pub. Date: Jan. 22, 2015

(65) Prior Publication Data
US 2016/0165654 A1     Jun. 9, 2016

(30) Foreign Application Priority Data

Jul. 18, 2013   (JP) ................................. 2013-149128

(51) Int. Cl.
*H04B 7/00* (2006.01)
*H04W 76/04* (2009.01)
(Continued)

(52) U.S. Cl.
CPC ........... *H04W 76/043* (2013.01); *H04L 47/24* (2013.01); *H04L 67/104* (2013.01);
(Continued)

(58) Field of Classification Search
CPC ............... H04W 4/08; H04W 28/0268; H04W 28/0284; H04W 28/08
(Continued)

(56) References Cited

U.S. PATENT DOCUMENTS 7,920,887 B2 * 4/2011 Cho ........................ H04W 4/02
455/16
8,942,173 B2 * 1/2015 Li ........................ H04W 72/044
370/328

(Continued)

FOREIGN PATENT DOCUMENTS

JP    HEI 06-085739 A    3/1994
JP    HEI 08-307934 A    11/1996
(Continued)

*Primary Examiner* — Dmitry H Levitan
(74) *Attorney, Agent, or Firm* — Chip Law Group

(57) ABSTRACT

Effective utilization and maintenance of direct communication are provided.
A state monitoring unit monitors a state of a predetermined number of terminal groups. Each terminal group includes a predetermined number of first communication terminals, and a second communication terminal that performs direct communication with the first communication terminals while being connected to a base station, When the state comes to fail to satisfy a certain condition, a group structure control unit changes a structure of the terminal groups. For example, the state monitoring unit monitors a communication traffic volume of data communication passing through the second communication terminal in each of the predetermined number of terminal groups. Also, for example, the state monitoring unit monitors a state (communication quality, remaining battery level, and the like) of the first communication terminal and/or the second communication terminal.

14 Claims, 10 Drawing Sheets

(51) Int. Cl.
*H04L 12/851* (2013.01)
*H04W 52/02* (2009.01)
*H04W 76/02* (2009.01)
*H04L 29/08* (2006.01)
*H04W 92/18* (2009.01)
*H04W 8/18* (2009.01)
*H04W 84/18* (2009.01)
*H04W 88/06* (2009.01)

(52) U.S. Cl.
CPC ..... *H04W 52/028* (2013.01); *H04W 52/0277* (2013.01); *H04W 76/023* (2013.01); *H04W 76/025* (2013.01); *H04W 8/186* (2013.01); *H04W 84/18* (2013.01); *H04W 88/06* (2013.01); *H04W 92/18* (2013.01); *Y02B 60/50* (2013.01)

(58) Field of Classification Search
USPC .......... 370/310, 328, 329, 389, 465
See application file for complete search history.

(56) References Cited

U.S. PATENT DOCUMENTS

| | | | |
|---|---|---|---|
| 9,042,892 B2* | 5/2015 | Choi | H04W 52/0212 |
| | | | 455/41.1 |
| 9,131,354 B2* | 9/2015 | Lee | H04W 4/005 |
| 2006/0172756 A1* | 8/2006 | Sharony | H04W 40/02 |
| | | | 455/519 |
| 2012/0044815 A1* | 2/2012 | Geirhofer | H04W 72/082 |
| | | | 370/248 |
| 2014/0295826 A1* | 10/2014 | Choi | H04W 28/0215 |
| | | | 455/426.1 |
| 2015/0229712 A1* | 8/2015 | Zhang | H04L 65/60 |
| | | | 709/204 |

FOREIGN PATENT DOCUMENTS

| | | |
|---|---|---|
| JP | 2001-238264 A | 8/2001 |
| JP | 2007-068151 A | 3/2007 |
| JP | 2008-532347 A | 8/2008 |
| JP | 2013-526157 A | 6/2013 |

* cited by examiner

FIG. 9

| MANAGE-MENT NO. | TERMINAL ID | DEDICATED TERMINAL | USER SETTINGS | MODE OF TERMINAL | DIRECT COMMUNICATION WIRELESS SYSTEM (SCORE) | REMAINING BATTERY LEVEL (SCORE) | CONNECTION STATE WITH BASE STATION (SCORE) |
|---|---|---|---|---|---|---|---|
| 1 | 0001 | Yes | OK | ACTIVE | BT, WLAN (2) | 90% (9) | −20dBm (9) |
| 2 | 0401 | No | OK | SLEEP | BT, WLAN (2) | 70% (7) | −50dBm (6) |
| 3 | 5002 | Yes | OK | ACTIVE | WLAN (1) | 20% (2) | −70dBm (4) |
| 4 | 0600 | No | OK | ACTIVE | BT, WLAN, Mesh (3) | 90% (9) | −30dBm (8) |
| 5 | 7762 | No | NG | ACTIVE | WLAN (1) | 80% (8) | −40dBm (7) |
| ⋮ | ⋮ | ⋮ | ⋮ | ⋮ | ⋮ | ⋮ | ⋮ |

CONTROL DEVICE TO CONTROL DIRECT COMMUNICATION AMONG COMMUNICATION TERMINALS

TECHNICAL FIELD

The present technology relates to a control device, a base station, and a communication terminal. In particular, the present technology relates to a control device that controls direct communication among terminals.

BACKGROUND ART

In public telecommunication, increased corresponding terminals and enlarged communication traffic volumes are recently causing a squeeze on wireless connection, leading to damages to user's convenience, such as decreased communication rates and interruption of communication. Especially in urban areas where corresponding terminals are densely used, connection is concentrated in a specific base station and therefore exceeds the communication capacity of a wireless portion of the base station, thereby failing to connect even to networks.

In connection between the base station and the terminals, a technology called multiple access is generally used, enabling a plurality of terminals to be apparently connected to one base station at the same time. Examples of a typical technology thereof may include FDMA, TDMA, and CDMA.

FDMA is an abbreviation for "Frequency Division Multiple Access", and enables connection with a plurality of terminals by allocating a different frequency to each terminal. TDMA is an abbreviation for "Time Division Multiple Access", and enables connection with a plurality of terminals by dividing a connection time into short time units and allocating this unit time to each terminal. CDMA is an abbreviation for "Code Division Multiple Access", and enables connection with a plurality of terminals by allocating a specific code to each terminal.

In each of these technologies, the number of terminals that can be connected at the same time has an upper limit. That is, in FDMA, the number of usable frequencies is limited, and therefore the number of terminals that can be connected at the same time has an upper limit. In TDMA, an interval between times to be allocated becomes longer as the number of terminals increases, causing decrease in communication rates. For this reason, the number of terminals that can be connected at the same time has an upper limit in order to maintain a certain quality (which differs depending on, for example, a telephone conversation or a video replay). In CDMA, a code to be allocated needs to have a specific rule (orthogonal code). The number of combinations of such codes has an upper limit, and therefore the number of terminals that can be connected at the same time has an upper limit.

Even with the technologies as described above, there is caused a situation where user's convenience is damaged by the limitation of multiple access due to the increased number of terminals and the concentration of terminals in recent years. Furthermore, communication of control information for allocating frequencies, unit times and codes to a plurality of terminals increases as the number of terminals increases. Accordingly, communication of control information itself also causes a squeeze on communication capacities.

Other than a wireless system involving connection to public networks, a wireless system (for example, a wireless LAN) which enables direct communication in a neighborhood is adopted in recent terminals (direct communication among terminals by this wireless system is referred to as "direct communication"). For example, Patent Literature 1 discloses a method of switching from communication via public networks to direct communication.

CITATION LIST

Patent Literature

Patent Literature 1: JP 2001-238264A

SUMMARY OF INVENTION

Technical Problem

An object of the present technology is to provide effective utilization and maintenance of direct communication.

Solution to Problem

The concept of the present technology is a control device including: a state monitoring unit that monitors a state of a predetermined number of terminal groups each including a predetermined number of first communication terminals and a second communication terminal performing direct communication with the first communication terminals while being also connected to a base station; and a group structure control unit that changes a structure of the terminal groups when the state comes to fail to satisfy a certain condition.

In the present technology, the state monitoring unit monitors the state of the predetermined number of terminal groups. Each terminal group includes the predetermined number of first communication terminals and the second communication terminal that performs direct communication with these first communication terminals while being also connected to the base station. Then, the group structure control unit changes the structure of the terminal groups when the state comes to fail to satisfy a certain condition.

For example, the state monitoring unit may monitor a communication traffic volume of data communication passing through the second communication terminal in each of the predetermined number of terminal groups, and the group structure control unit may change the structure of the terminal groups when a difference of a certain value or more is caused between the communication traffic volumes of the predetermined number of terminal groups.

For example, the state monitoring unit may be configured to monitor the state of the first communication terminals and/or the second communication terminal. In this case, for example, the state monitoring unit may be configured to monitor the state of direct communication between the first communication terminal and the second communication terminal, while the group structure control unit may change the structure of the terminal group when the communication quality of direct communication between the first communication terminal and the second communication terminal reaches a certain value or less.

In this case, for example, the state monitoring unit may monitor a remaining battery level of the second communication terminal, and the group structure control unit may change the structure of the terminal groups when the remaining battery level of the second communication terminal reaches a certain value or less.

In this case, for example, the state monitoring unit may monitor a state of communication between the second communication terminal and the base station, and the group structure control unit may change the structure of the terminal groups when a quality of communication between the second communication terminal and the base station reaches a certain value or less.

In this case, for example, the state monitoring unit may monitor which of an active mode and a sleep mode a mode of the second communication terminal is, and the group structure control unit may change the structure of the terminal groups when the second communication terminal has shifted from the active mode to the sleep mode.

As described above, according to the present technology, the state of the predetermined number of terminal groups performing direct communication is monitored, and when the state comes to fail to satisfy a certain condition, the structure of the terminal group is changed. This enables effective utilization and maintenance of direct communication. For example, communication is maintained by changing the topology of direct communication corresponding to the movement of the communication terminal. Also, a load of a master machine (the second communication terminal) is reduced by changing the topology of direct communication depending on the communication traffic volume of data communication passing through the master machine.

In addition, the concept of the present technology is a base station including: a communication unit that wirelessly performs communication with a communication terminal; and a control unit that controls wireless communication through the communication unit. The control unit monitors a state of a predetermined number of terminal groups each including a predetermined number of first communication terminals and a second communication terminal performing direct communication with the first communication terminals while being also connected to the base station, and changes a structure of the terminal groups when the state comes to fail to satisfy a certain condition.

In the present technology, the communication unit and the control unit are provided. The communication unit performs wireless communication with communication terminals. The control unit controls wireless communication through the communication unit. In this technology, the control unit monitors the state of the predetermined number of terminal groups each including the predetermined number of first communication terminals and the second communication terminal which performs direct communication with the first communication terminals while being also connecting to the base station, and changes the structure of the terminal groups when the state comes to fail to satisfy a certain condition.

As described above, according to the present technology, the state of the predetermined number of terminal groups performing direct communication is monitored, and when the state comes to fail to satisfy a certain condition, the structure of the terminal groups is changed. This enables effective utilization and maintenance of direct communication. For example, communication is maintained by changing the topology of direct communication corresponding to the movement of a communication terminal. Also, a load of a master machine (the second communication terminal) is reduced by changing the topology of direct communication depending on the communication traffic volume of data communication passing through the master machine.

In addition, the concept of the present technology is a communication terminal including: a first communication unit that wirelessly performs direct communication with another communication terminal; a second communication unit that performs wireless communication with a base station; and a control unit that controls wireless communication through the first communication unit and the second communication unit. The control unit reports a communication state with the another communication terminal performing direct communication by the first communication unit, to a control device through the second communication unit.

In the present technology, the first communication unit, the second communication unit, and the control unit are provided. The first communication unit wirelessly performs direct communication with another communication terminal. The second communication unit performs wireless communication with the base station. The control unit controls wireless communication through the first communication unit and the second communication unit. Then, the control unit reports a communication state with another communication terminal which performs direct communication by the first communication unit, to the control device through the second communication unit.

As described above, in the present technology, the communication state with another communication terminal which performs direct communication by the first communication unit is reported to the control device through the second communication unit. Therefore, the control device can appropriately change the topology of direct communication corresponding to, for example, the movement of a communication terminal (another communication terminal).

In addition, the concept of the present technology is a control device including: a connection request receiving unit that receives, from a first communication terminal, a request for connection with a base station; a judging unit that judges whether a wireless communication capacity of the base station is a certain value or more when the connection request is received; and a control unit that controls direct communication target terminals, which include the first communication terminal and a second communication terminal neighboring to the first communication terminal, or the second communication terminal neighboring to the first communication terminal, to perform direct communication when the wireless communication capacity of the base station is judged to be the certain value or more.

In the present technology, a connection request receiving unit receives, from a first communication terminal, a request for connection with a base station. A judging unit judges whether a wireless communication capacity of the base station is a certain value or more when the connection request is received. A control unit controls direct communication target terminals, which include the first communication terminal and a second communication terminal neighboring to the first communication terminal, or the second communication terminal neighboring to the first communication terminal, to perform direct communication when the wireless communication capacity of the base station is judged to be the certain value or more.

For example, the control unit may include a terminal selecting unit that selects a candidate terminal that becomes a candidate for the second communication terminal, a confirmation request transmitting unit that transmits, to each of the direct communication target terminals, a request to confirm whether direct communication is possible or not, a confirmation result receiving unit that receives a confirmation result from part or all of the direct communication target terminals, a judging unit that judges, based on the confirmation result, whether each of the direct communication target terminals is capable of direct communication, and a switching request transmitting unit that, when direct communication is judged to be possible, transmits a request for switching to direct communication to each of the direct communication target terminals.

In this case, for example, the terminal selecting unit may select, as the candidate terminal, a communication terminal being connected to the base station with which the first communication terminal requests for connection. Alternatively, in this case, for example, the terminal selecting unit may select, as the candidate terminal, a communication terminal that is connected to the base station with which the first communication terminal requests for connection and that has been already performing direct communication with another communication terminal. Alternatively, in this case, for example, the terminal selecting unit may select the candidate terminal in a manner that the direct communication target terminals have a common direct communication wireless system.

Also, in this case, for example, information for confirming whether direct communication is possible or not, including at least information on a direct communication wireless system and identification information of a partner terminal, may be configured to be inserted into the confirmation request to be transmitted by the confirmation request transmitting unit. By inserting the information for confirming whether direct communication is possible or not into the confirmation request as described above, processing such as communication for confirming whether direct communication is possible or not on the communication terminal side, for example, measurement of a received electric field intensity, can be efficiently performed.

Also, in this case, for example, at least information on a direct communication wireless system and identification information of a partner terminal may be configured to be contained in the switching request to be transmitted by the switching request transmitting unit. By containing such information in the switching request, switching to direct communication on the communication terminal side comes to be easily and appropriately performed.

Also, in this case, for example, there is also further provided a master machine determining unit that determines a master machine to be connected with the base station at the same time, from the first communication terminals and candidate terminals, when the judging unit judges that direct communication is possible. Furthermore, information on the determined master machine may be configured to be contained in the switching request transmitted by the switching request transmitting unit. This facilitates selection and establishment of the master machine on the communication terminal side.

Thus, in the present technology, when a request for connection to the base station is received from a predetermined communication terminal, a neighboring communication terminal, which includes or does not include the predetermined communication terminal, is controlled to perform direct communication, provided that the wireless communication capacity of the base station is a certain value or more. This enables mitigation of the scarcity of wireless capacity.

Also, in the present technology, a confirmation request is transmitted to the communication terminal side to see whether direct communication is possible or not, and a switching request to direct communication is transmitted to the communication terminal side, when direct communication is judged to be possible based on the confirmation result. This enables prevention of occurrence of a state where communication is actually impossible when switched to direct communication, thereby allowing for favorable switching to direct communication.

In addition, the concept of the present technology is a control device including: a confirmation request transmitting unit that transmits, to a plurality of direct communication target communication terminals, a request to confirm whether direct communication is possible or not; a confirmation result receiving unit that receives a confirmation result from part or all of the plurality of direct communication target communication terminals; a judging unit that judges, based on the confirmation result, whether the plurality of direct communication target communication terminals can perform direct communication or not; and a switching request transmitting unit that transmits, to the plurality of direct communication target communication terminals, a request for switching to direct communication, when direct communication is judged to be possible.

In the present technology, a confirmation request is transmitted by the confirmation request transmitting unit to the plurality of communication terminals, which is a target of direct communication, to see whether direct communication is possible or not. The judging unit judges, based on the confirmation result, whether direct communication is possible or not for the plurality of communication terminals. When direct communication is judged to be possible, a switching request to direct communication is transmitted to the plurality of communication terminals.

Thus, in the present technology, a confirmation request is transmitted to the communication terminal side to see whether direct communication is possible or not, and a switching request to direct communication is transmitted to the communication terminal side, when direct communication is judged to be possible based on the confirmation result. This enables prevention of occurrence of a state where communication is actually impossible when switched to direct communication, thereby allowing for favorable switching to direct communication.

Advantageous Effects of Invention

According to the present technology, direct communication can be effectively utilized and maintained. It is noted that the effects described herein are not necessarily limiting, and any one of the effects described in the present disclosure may be exerted.

BRIEF DESCRIPTION OF DRAWINGS

FIG. 9 is a diagram showing an example of abilities of each terminal retained in a database.

DESCRIPTION OF EMBODIMENTS

Hereinafter, a mode for carrying out the invention (hereinafter, referred to as an "embodiment") will be described. It is noted that description will be provided in the following order.

1. Embodiments
2. Variations

1. Embodiments

[Example of Structure of Communication System]

Figure 1:
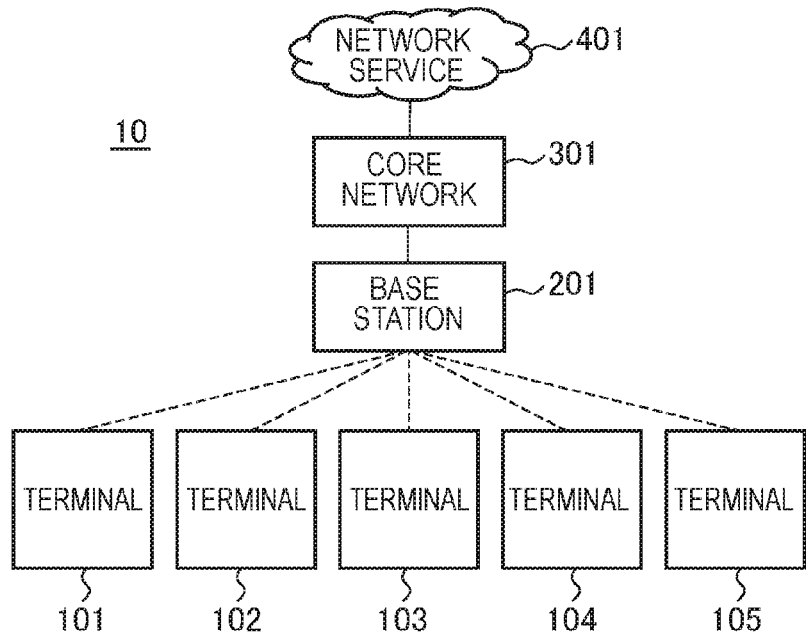
FIG. 1 is a block diagram showing an example of a structure of a communication system as an embodiment.

FIG. 1 shows an example of a structure of a communication system 10 as an embodiment. This communication system 10 includes communication terminals 101 to 105, a base station 201, a core network 301, and a network service 401. The communication terminals 101 to 105 are wirelessly connected to the base station 201. Hereinafter, the "communication terminal" is appropriately referred to as the "terminal".

In this state, for example, the communication terminal 101 communicates with the network service 401 through the base station 201 via the core network 301. Also, in this state, for example, the communication terminal 101 communicates with the communication terminal 102 via the base station 201 and the core network 301.

Figure 2:
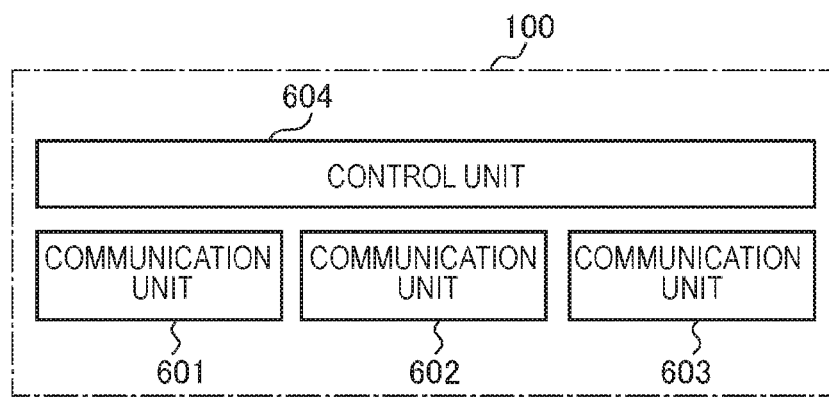
FIG. 2 is a block diagram showing an example of a structure of a communication terminal.

FIG. 2 shows an example of a structure of a communication terminal 100 (the communication terminals 101 to 105). The communication terminal 100 has a plurality of communication units, and has three communication units 601 to 603 in the shown example. One communication unit, for example, the communication unit 601, is a communication unit, such as 3rd Generation (3G: third generation cellular phone) and long term evolution (LTE), to be used for the connection to the base station 201. Another communication unit, for example, the communication units 602 and 603, is a communication unit, such as wireless LAN and Bluetooth, to be used for direct communication. The communication terminal 100 also has a control unit 604. This control unit 604 controls wireless communication through the communication units 601 to 603 while controlling coordination among the communication units.

Figure 3:
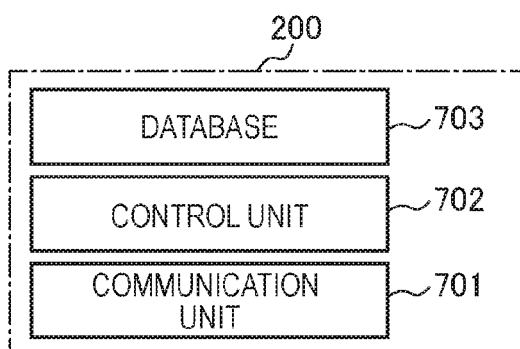
FIG. 3 is a diagram showing an example of a structure of a control device (a base station and a core network).

FIG. 3 shows an example of a structure of a control device 200 (the base station 201 and the core network 301). The control device 200 has a communication unit 701, a control unit 702, and a database 703. The communication unit 701 is a communication unit to be used for the connection with the terminal. The control unit 702 controls wireless communication through the communication unit 701 while exchanging information with the database 703. The database 703 stores information on the terminals.

The relationship between the base station 201 and the core network 301 of FIG. 1, and the communication unit 701, the control unit 702 and the database 703 of FIG. 3, depends on implementation, For example, the communication unit 701 and the control unit 702 may be disposed in the base station 201, while the database 703 may be disposed in the core network 301.

[Method in which Control Device Understands Direct Communication Wireless System of Terminal]

Figure 4:
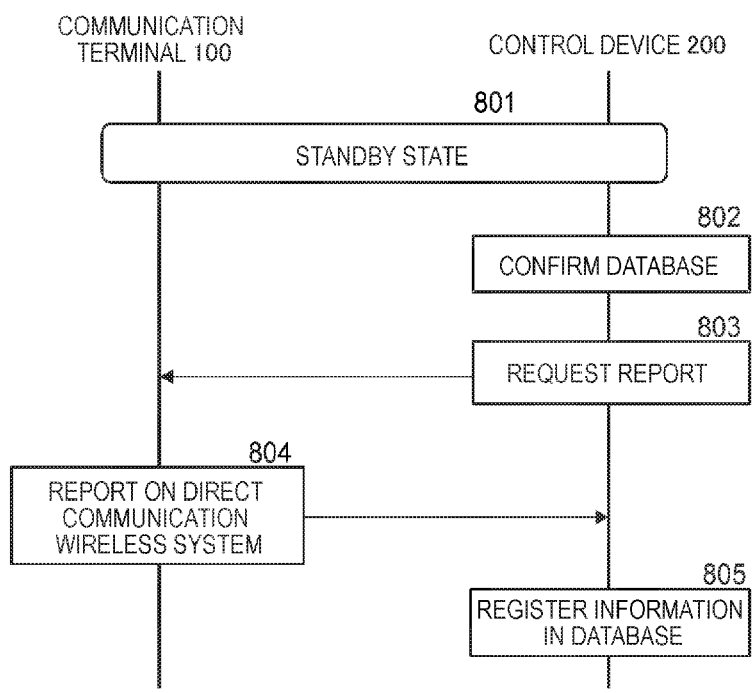
FIG. 4 is a diagram for explaining processing performed when a control device understands a direct communication system of a communication terminal.

There will be described a method in which the control device 200 understands a direct communication wireless system of the terminal A sequence diagram of FIG. 4 shows processing performed when the control device 200 understands the direct communication wireless system of the communication terminal 100. It is noted that similar processing applies to the communication terminals 101 to 105 in the communication system 10 of FIG. 1.

The communication terminal 100 (the communication terminals 101 to 105) is connected to the control device 200 after a power source is turned on to become in a standby state (step 801). Detailed description on this procedure, which is a general procedure in cellular phones, is omitted.

The control device 200 understands an ID of the communication terminal 100 in a standby state. For example, a terminal-specific ID such as IMEI and IMSI is applicable. The control device 200 confirms, based on this ID, information on the direct communication wireless system of the communication terminal 100, which is stored in the database 703 (step 802).

When the information on the direct communication wireless system of the communication terminal 100 is not stored in the database 703, or when a certain time has elapsed, the control device 200 requests, to the communication terminal 100, a report on the direct communication wireless system (step 803).

The terminal 100, to which a report has been requested, reports on a compatible direct communication wireless system (step 804). Here, examples of the information to be reported include a wireless system, corresponding frequency, processing ability, transmitted electric power, minimum receivable electric field intensity, approval or disapproval of utilization, and remaining battery level.

The control device 200, which has received the report from the communication terminal 100, stores the information in the database 703 (step 805).

It is noted that although the above description mentions that a report is requested from the control device 200 to the communication terminal 100, the communication terminal 100 may voluntarily send a report. For example, a report is sent from the communication terminal 100, when, for example, a condition of approval or disapproval of utilization by a user has been changed. The control device 200, which has received the report, updates information stored in the database 703.

[Method in which Control Device Judges Whether Direct Communication Among Terminals is Possible]

Figure 5:
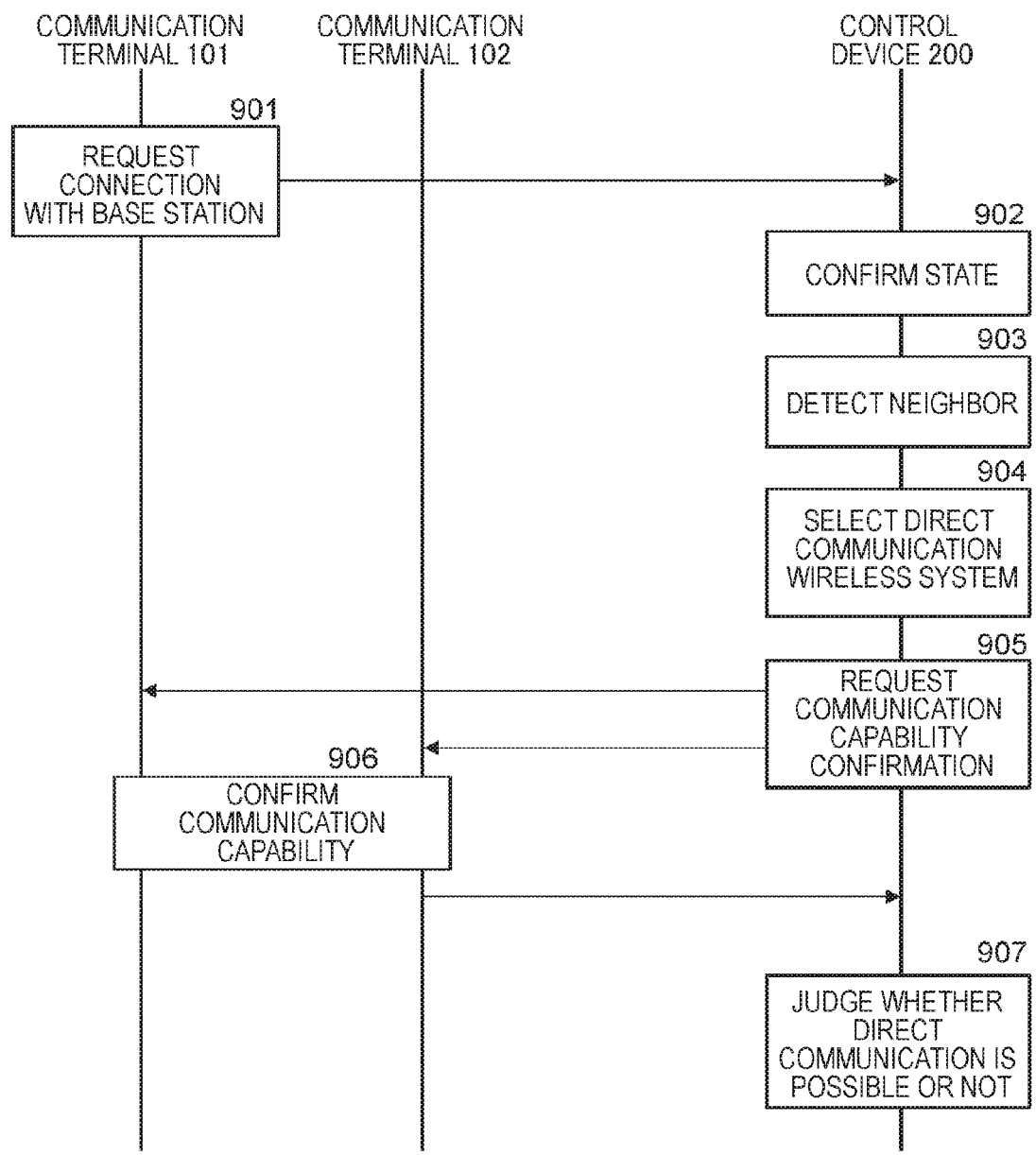
FIG. 5 is a diagram for explaining processing in which a control device judges whether direct communication between terminals is possible or not.

There will be described a method in which a control device judges whether direct communication among terminals is possible or not. A sequence diagram of FIG. 5 shows processing in which the control device 200 judges whether direct communication among terminals is possible or not. In the shown example, processing in two terminals is illustrated. Although detailed description is omitted, similar processing applies to when three or more terminals are involved.

The communication terminal 101 requests, to the control device 200, connection with the base station 201 (step 901). An assumed example of the case when this connection request is made include when the communication terminal 101 attempts to access to the Internet or the like through the base station 201.

The control device 200 confirms a communication state. Here, the control device 200 confirms whether the wireless communication capacity of the base station 201 has reached a certain value or more relative to an upper limit. When the wireless communication capacity at the time of this connection request is a certain value or more, for example, 75%, the control device 200 judges that further communication with terminals causes scarcity of communication thereby leading to concerns of reduced service, and proceeds to processing for switching neighboring terminals to direct communication (step 903 and thereafter).

It is noted that although not shown, when the wireless communication capacity at the time of this connection request does not reach a certain value, for example, the control device 200 puts the communication terminal 101 in a state of being connected to the base station 201 without performing processing for switching neighboring terminals to direct communication.

When the wireless communication capacity of the base station 201 reaches a certain value or more relative to an upper limit, the control device 200 performs neighbor detection (step 903). In the neighbor detection, there are selected a predetermined number of terminals (candidate terminals) that become candidates for performing direct communication with the communication terminal 101 having sent a connection request to the base station 201.

For example, the control device 200 selects, as a candidate terminal, a terminal connected to the base station 201 with which the communication terminal 101 requests to be connected. Alternatively, for example, the control device 200 selects, as a candidate terminal, a terminal having already performing direct communication with another terminal, among the terminals connected to the base station 201 with which the communication terminal 101 requests to be connected. Here, the control device 200 confirms information in the database 703, and selects, as a candidate terminal, a terminal having the same direct communication wireless system as the communication terminal 101.

The control device 200 confirms information in the database 703 based on an ID of each terminal (an ID of the terminal having requested to be connected and an ID of a candidate terminal), and then select a direct communication wireless system which is common among the terminals (step 904). Then, the control device 200 transmits, to the terminals, a request to confirm whether direct communication is possible by the selected direct communication wireless system (step 905). In the shown example, the communication terminal 102 is selected as a candidate terminal.

In this confirmation request, there is inserted information with which each terminal confirms whether direct communication is possible or not. For example, in this confirmation request, there are included the selected direct communication wireless system, a measurement time (start time and measurement period), IDs of terminals to be measured, and a parameter specific to the direct communication wireless system. Here, the measurement time indicates the timing for confirming whether direct communication between terminals is possible or not. The measurement target is the communication terminal 101 having requested to be connected and the communication terminal 102 being a candidate terminal.

The ID of the measurement target terminal is, for example, a MAC address or a device name. Examples of the parameter specific to a direct communication wireless system include a frequency to be used, designation of a role in a wireless LAN (an access point or a station, or Wi-Fi Direct), an identifier (SSID) in a wireless LAN, and designation of a role in Bluetooth (BT) (a terminal to issue an inquiry command or a terminal to stand by and respond). It is noted that "Bluetooth" is a registered trademark.

The terminals having received a communication capability confirmation request from the control device 200 confirm whether direct communication is possible or not based on the information contained in the request (step 906). The confirmation method differs depending on the selected direct communication wireless system. The following examples will be described.
(Example 1) When roles of AP and STA are designated in a wireless LAN,
(Example 2) When Wi-Fi Direct is designated in a wireless LAN,
(Example 3) When BT is selected
(Example 4) When Mesh is selected Example 1

There will be described a case in which a wireless LAN is selected as a direct communication wireless system, and the roles of AP and STA are designated. For example, it is assumed that the communication terminal 101 is an access point (AP), and the communication terminal 102 is a station (STA).

The communication terminal 101 acts as an AP during a designated measurement time. Specifically, the communication terminal 101 periodically transmits a signal called a beacon in a designated frequency. This beacon is provided with a service set identifier (SSID) that is an identifier in a wireless LAN, and the SSID can be read in a receiver terminal. This beacon is also provided with a MAC address of the communication terminal 101, and the MAC address can be similarly read in a receiver terminal.

The communication terminal 102 acts as an STA during a designated measurement time. Specifically, the communication terminal 102 receives a beacon signal in a designated frequency to measure an electric field intensity. The communication terminal 102 can judge that a beacon signal having a designated MAC address and SSID, among the received beacon signals, is the terminal to be measured.

After a designated measurement time has elapsed, the communication terminal 102 reports the measured electric field intensity as a confirmation result to the control device 200. The control device 200 compares the reported electric field intensity with the minimum receivable electric field intensity stored in the database 703 to judge whether direct communication is possible or not (step 907). For example, when the reported electric field intensity is more than the minimum receivable electric field intensity for each of the communication terminal 101 and the communication terminal 102 stored in the database 703, the control device 200 judges that direct communication is possible.

It is noted that although the communication terminal 102 measured and reported the received electric field intensity in the above description, there is defined, as a general function of a wireless LAN, a procedure in which an STA transmits a probe request to an AP, and the AP transmits as a response to the request a probe response to the STA. This procedure is called an active scan.

When the communication terminal 102 as an STA executes an active scan within a designated measurement time, the communication terminal 101 as an AP can measure the received electric field intensity in response to the receipt of a probe request, and the communication terminal 102 as an STA can measure the received electric field intensity in response to the receipt of a probe response.

In this case, each of the communication terminal 101 and the communication terminal 102 reports the measured electric field intensity as the confirmation result to the control device 200. The control device 200 compares the electric field intensity reported from each terminal with the minimum receivable electric field intensity stored in the database 703 to judge whether direct communication is possible or not (step 907). For example, when the electric field intensity reported by the communication terminal 101 is more than the minimum receivable electric field intensity of the communication terminal 101 stored in the database 703, and the electric field intensity reported by the communication terminal 102 is more than the minimum receivable electric field intensity of the communication terminal 102 stored in the database 703, the control device 200 judges that direct communication is possible.

Also, in another method, the roles of the communication terminal 101 and the communication terminal 102 are reversely designated in a wireless LAN, which is one of the parameters in the confirmation request of step 904, thereby enabling the communication terminal 101 to report the measured electric field intensity as the confirmation result to the control device 200. Accordingly, the control device 200 can obtain the received electric field intensity measured from each of the communication terminal 101 and the communication terminal 102. Then, for example, when the electric field intensity reported by the communication terminal 101 is more than the minimum receivable electric field intensity of the communication terminal 101 stored in the database 703, and the electric field intensity reported by the communication terminal 102 is more than the minimum receivable electric field intensity of the communication terminal 102 stored in the database 703, the control device 200 judges that direct communication is possible.

Example 2

There will be described a case in which a wireless LAN is selected as a direct communication wireless system, and Wi-Fi Direct is designated. In Wi-Fi Direct, the communication terminal 101 and the communication terminal 102 have an equal role. The specifications specify that each terminal transmits a probe request, and a terminal having received this probe request offers a probe response. Accordingly, the received electric field intensity can be measured in each of the communication terminal 101 and the communication terminal 102.

In this case, each of the communication terminal 101 and the communication terminal 102 reports the measured electric field intensity as the confirmation result to the control device 200. The control device 200 compares the electric field intensity reported from each terminal with the minimum receivable electric field intensity stored in the database 703 to judge whether direct communication is possible (step 907). It is noted that the criterion in this case is similar to that when the measured electric field intensity is reported from each of the communication terminal 101 and the communication terminal 102 to the control device 200 in the above-described case where a wireless LAN is selected.

Example 3

There will be described a case in which BT is selected as a direct communication wireless system. In BT, the specifications specify that one terminal transmits an inquiry command, and a terminal having received this inquiry command returns a reply. The communication terminal 101 and the communication terminal 102 receive an inquiry command and a reply to the inquiry command respectively, thereby to measure respective received electric field intensities.

In this case, each of the communication terminal 101 and the communication terminal 102 reports the measured electric field intensity as the confirmation result to the control device 200. The control device 200 compares the electric field intensity reported from each terminal with the minimum receivable electric field intensity stored in the database 703 to judge whether direct communication is possible (step 907). It is noted that the criterion in this case is similar to that when the measured electric field intensity is reported from each of the communication terminal 101 and the communication terminal 102 to the control device 200 in the above-described case where a wireless LAN is selected.

Example 4

There will be described a case in which Mesh is selected as a direct communication wireless system. In Mesh, the specifications specify that each terminal periodically transmits a beacon signal. Each terminal can receive a beacon signal of another terminal during a time when each terminal itself does not transmit a beacon signal. Accordingly, each of the communication terminal 101 and the communication terminal 102 can measure the received electric field intensity.

In this case, each of the communication terminal 101 and the communication terminal 102 reports the measured electric field intensity as the confirmation result to the control device 200. The control device 200 compares the electric field intensity reported from each terminal with the minimum receivable electric field intensity stored in the database to judge whether direct communication is possible (step 907). It is noted that the criterion in this case is similar to that when the measured electric field intensity is reported from each of the communication terminal 101 and the communication terminal 102 to the control device 200 in the above-described case where a wireless LAN is selected.

It is noted that in the above-described processing example shown in FIG. 5, the communication terminal 101 is included in the terminals that become a target of direct communication. However, it is conceivable that the communication terminal 101 is not included in the target of direct communication. Examples of such a case include when the communication terminal 101 is a terminal with high priority, such as a special terminal owned by public institutions and a terminal having a special contract with general users. In this case, communication between the communication terminal 101 and the base station 201 has priority, and two or more other terminals are selected as candidate terminals for direct communication.

Figure 6:
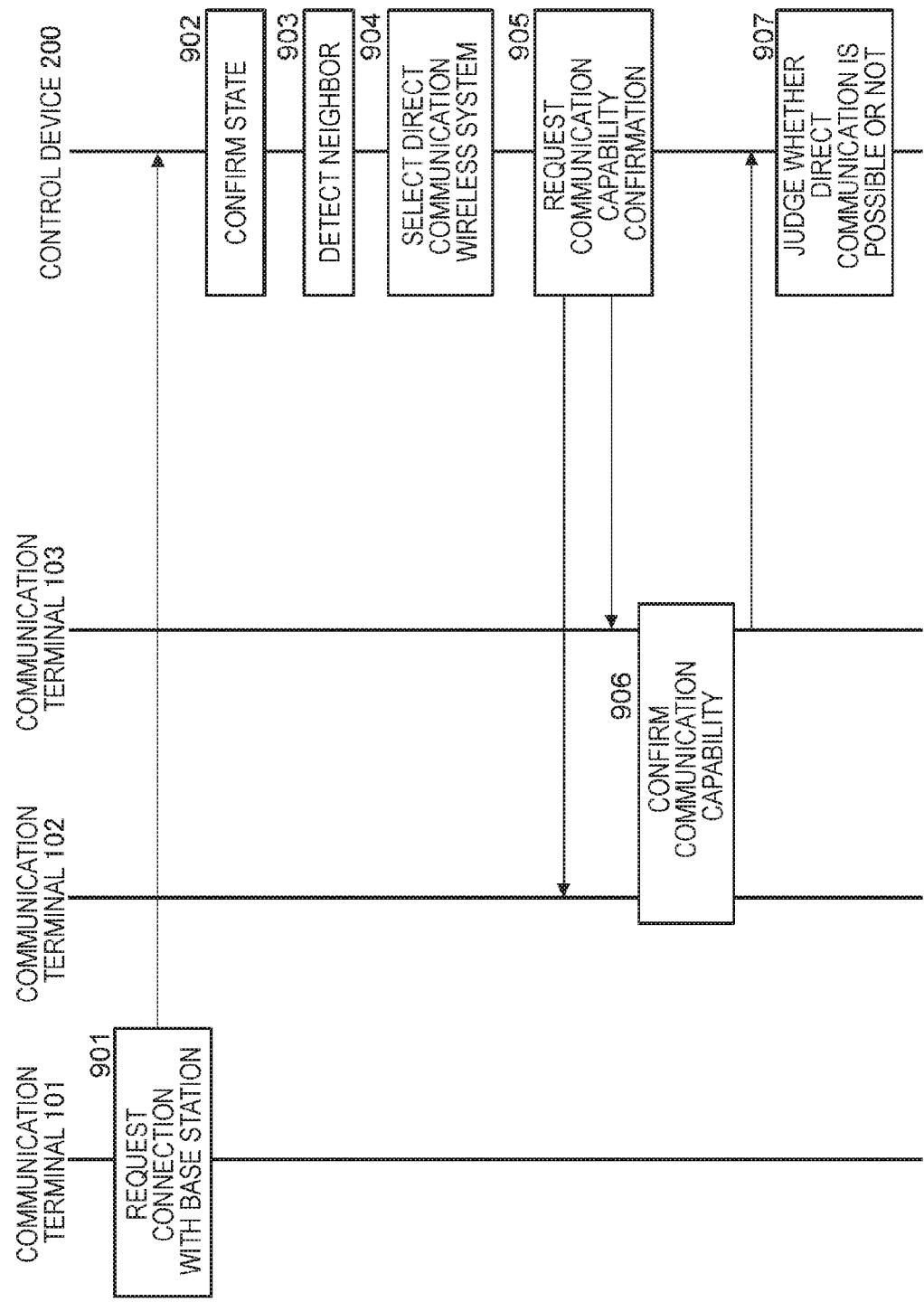
FIG. 6 is a diagram for explaining processing in which a control device judges whether direct communication between terminals is possible or not.

A sequence diagram of FIG. 6 shows an example of processing in which the control device 200 judges whether direct communication between the terminals is possible in that case. In this example, the control device 200 selects terminals other than the communication terminal 101 as candidate terminals in neighbor detection (step 903). In this example, two terminals, that is the communication terminal 102 and the communication terminal 103, are selected. Then, the control device 200 transmits, to these candidate terminals, a request to confirm whether direct communication is possible by the selected direct communication wireless system (step 905). It is noted that other steps are similar to the processing example shown in FIG. 5 as described above, and therefore description thereof is omitted.

[Method of Switching Terminals to Direct Communication]

There will be described a method of switching the terminals to direct communication. The control device 200 requests, to the terminal that has been judged to be capable of direct communication, to switch to direct communication. Hereinafter, a procedure thereof will be described.

Figure 7:
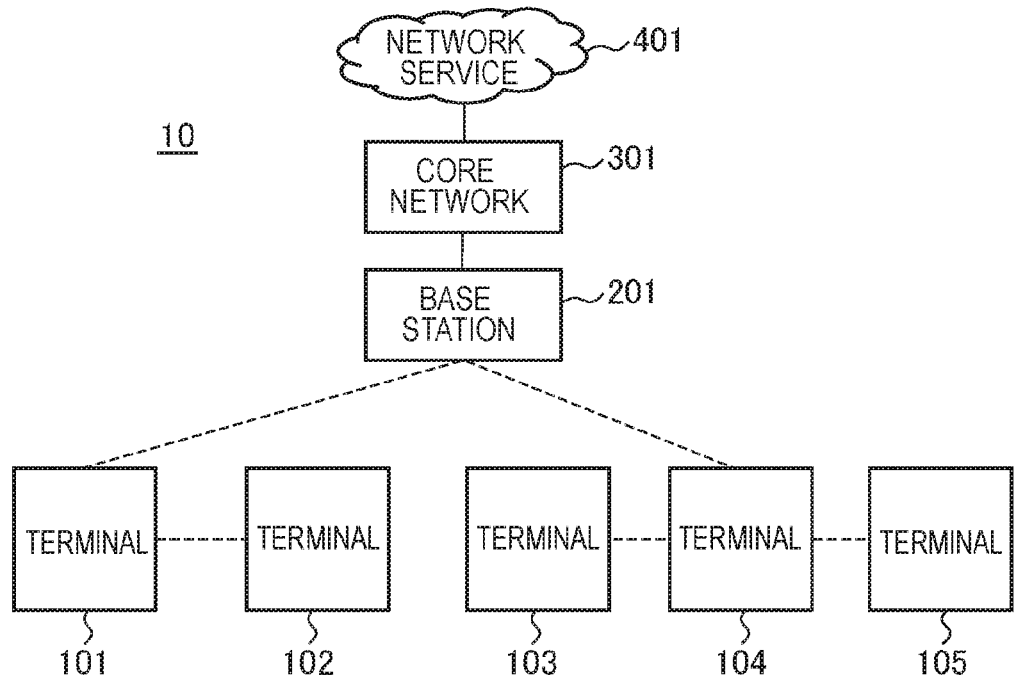
FIG. 7 is a diagram showing an example of a system structure when switched to direct communication.

FIG. 7 shows an example of a system structure when switched to direct communication. In this example, the communication terminal 101 and the communication terminal 102 perform direct communication, while the communication terminal 104, and the communication terminal 103 and the communication terminal 105 perform direct communication. Also, the communication terminal 101 and the communication terminal 104 concurrently perform communication with the base station 201. In this example, the communication terminal 101 and the communication terminal 102 neighbors to each other, and the communication terminal 103, the communication terminal 104, and the communication terminal 105 are in the neighborhood to each other.

Here, a communication terminal (the communication terminal 101 and the communication terminal 104) that communicates with the base station 201 is referred to as a "master machine". On the other hand, a communication terminal that performs direct communication without communicating with the base station 201 is referred to as a "slave machine".

Figure 8:
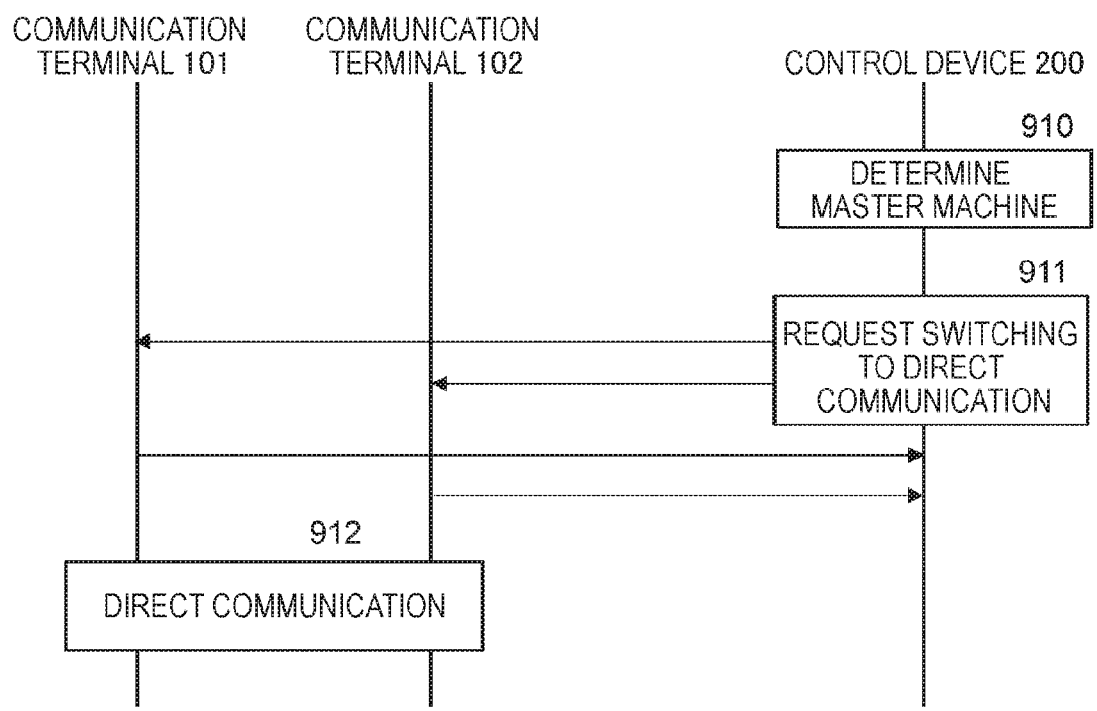
FIG. 8 is a diagram for explaining processing of switching communication terminals to direct communication.

A sequence diagram of FIG. 8 shows processing of switching, for example, two terminals that are the communication terminal 101 and the communication terminal 102, to direct communication. The control device 200 determines the master machine (step 910). The master machine is a communication terminal that performs direct communication while communicating with the base station 201 at the same time. The master machine in FIG. 7 is the communication terminal 101 and the communication terminal 104. It is noted that when the communication terminal 102 is the master machine, the communication terminal 102 can be defined to be the master machine, and the processing of determining the master machine in step 910 can be skipped.

For example, the control device 200 preferentially selects a predetermined dedicated terminal as a master machine. Examples thereof include a terminal which acts as a relay terminal for neighboring terminals when lines are busy such as in disaster situations, and a dedicated terminal prepared by business organizations or the like. Also, for example, the control device 200 selects the master machine based on the remaining battery level of the communication terminal. Also, for example, the control device 200 selects, as the master machine, a terminal having a good connection state with the base station 201.

Also, for example, the control device 200 selects the master machine based on the setting of the communication terminal. The control device 200 selects the master machine, for example, based on the information previously set by a user on whether to permit or not. In this case, as a conceivable method for promoting permission by a user, a monthly discount is applied for permission. It is noted that determination by the control device 200 has priority in emergencies.

Also, for example, the control device 200 selects, as the master machine, a terminal having more compatible direct communication wireless systems. Also, for example, the control device 200 preferentially selects a terminal in an active mode as the master machine. In brief, a terminal in a sleep mode is not selected as the master machine.

An example of the above-described plurality of criterion items used for selecting the master machine will be described. The control device 200 can recognize abilities of each communication terminal as described above, and the result thereof is retained in the database 703 (see FIG. 4). FIG. 9 shows an example of the abilities of each terminal retained in the database 703.

"Management No." is a number allocated for a purpose of the management of the database 703. "Terminal ID" is a number to identify the communication terminal. This number is specific to the terminal, and a MAC address or the like is applicable. In the drawing, a four-digit number is indicated in a simplification notation. "Dedicated terminal" indicates whether it is a dedicated terminal or not.

"User setting" is an item set by a user, indicating whether the terminal is to become a master machine or not. "Mode of terminal" indicates which of an active mode and a sleep mode the connection state between the communication terminal and the base station 201 is. "Direct communication wireless system" indicates a direct communication wireless system to which the communication terminal is compatible. A numerical value in parentheses is a value indicating priority for determining the master machine. This value becomes larger as the number of compatible wireless systems is larger.

"Remaining battery level" indicates a remaining battery level of the terminal. A numerical value in parentheses is a value indicating priority for determining the master machine. This value becomes larger as the remaining battery level is higher. "Connection state with base station" indicates a communication quality (received electric field intensity) with the base station 201. A numerical value in parentheses is a value indicating priority for determining the master machine. This value becomes larger as the communication quality is higher.

Figure 10:
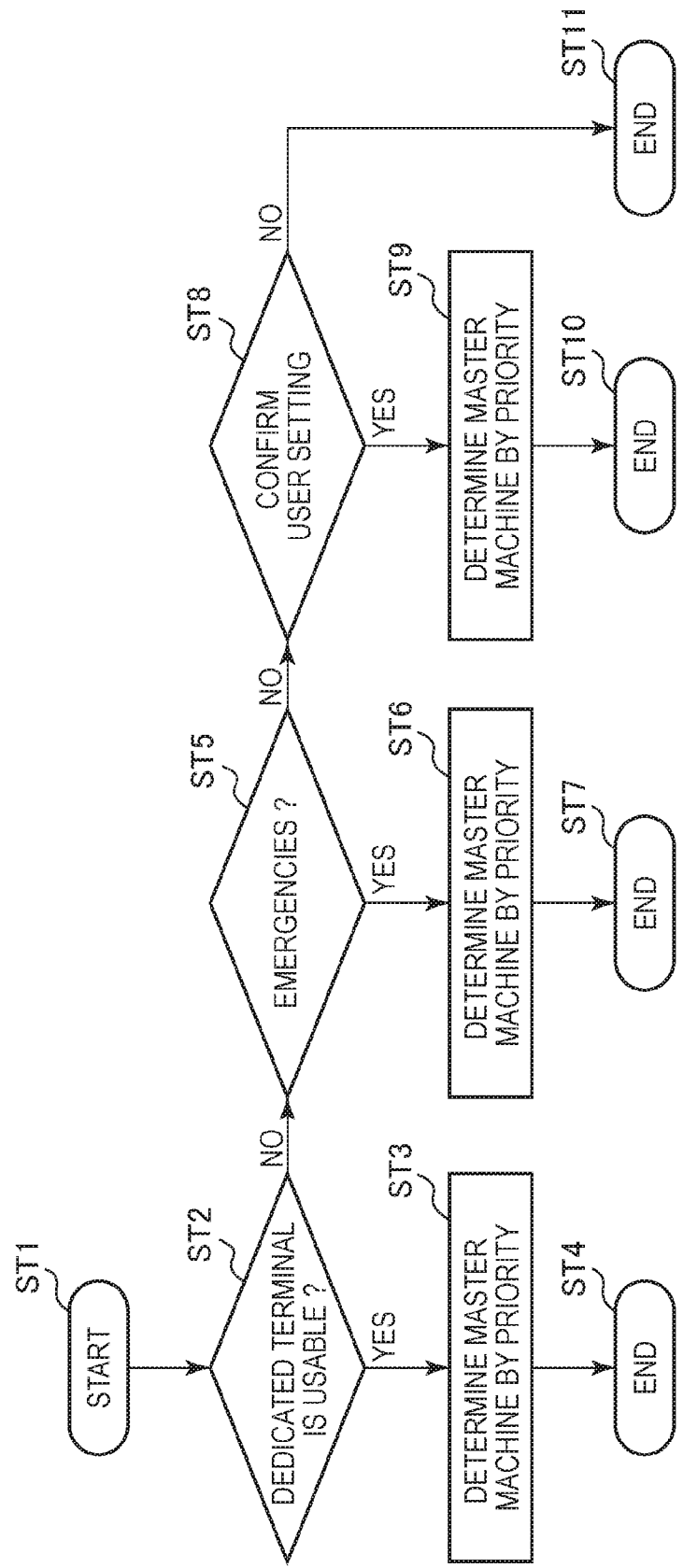
FIG. 10 is a flow chart showing an example of a processing procedure for determining a master machine in a control device.

A flow chart of FIG. 10 shows an example of a processing procedure for determining the master machine in the control device 200. The control device 200 starts processing in step ST1, and thereafter proceeds to processing of step ST2. In this step ST2, the control device 200 confirms whether a dedicated terminal can be used.

The control device 200 refers to the database 703 to confirm items of Dedicated terminal, User setting, and Mode of terminal, and judges whether the dedicated terminal can be used. When Dedicated terminal is "Yes", User setting is "OK", and Mode of terminal is "active", it is judged that the dedicated terminal can be used. When it is judged in step ST2 that a usable terminal exists, the control device 200 proceeds to processing of step ST3.

In this step ST3, the control device 200 sums up the numerical values (priorities) that have been scored in terms of Direct communication wireless system, Remaining battery level, and Connection state with base station, for a predetermined number of corresponding terminals, and determines a terminal having the highest numerical value (priority) as the master machine. Thereafter, the control device 200 ends the processing in step ST4.

When a usable terminal does not exist in step ST2, the control device 200 proceeds to processing of step ST5. In this step ST5, the control device 200 confirms whether emergencies arise or not. When emergencies arise, the control device 200 proceeds to processing of step ST6 for all terminals, regardless of items of Dedicated terminal, User setting, and Mode of terminal in the database 703.

In this step ST6, the control device 200 sums up the numerical values (priorities) that have been scored in terms of Direct communication wireless system, Remaining battery level, and Connection state with base station, for all terminals, and determines a terminal having the highest numerical value (priority) as the master machine. Thereafter, the control device 200 ends the processing in step ST7.

When emergencies do not arise in step ST5, the control device 200 proceeds to processing of step ST8. In this step ST8, the control device 200 confirms User setting. When a terminal having User setting of "OK" exists, the control device 200 proceeds to processing of step ST9. In this step ST9, the control device 200 sums up the numerical values (priorities) that have been scored in terms of Direct communication wireless system, Remaining battery level, and Connection state with base station, for a predetermined number of corresponding terminals, and determines a terminal having the highest numerical value (priority) as the master machine. Thereafter, the control device 200 ends the processing in step ST10.

When the terminal having User Setting of OK does not exist in step ST8, the control device 200 immediately proceeds to step ST11 to end the processing without selecting the master machine. It is noted that when the master machine cannot be selected in this manner, it is judged that each terminal is to communicate with the base station 201.

Returning to FIG. 8, the control device 200 transmits a direct communication switching request to the terminals to be switched to direct communication (step 911). For example, this switching request contains an ID of a connection partner. Examples of this ID include a MAC address, IP address, IMEI, and IMSI.

This switching request further contains, for example, a determined master machine, direct communication wireless system, start time, ID (MAC address and IMEI) of each terminal, and parameter specific to a direct communication wireless system. Examples of the parameter specific to a direct communication wireless system include a frequency to be used, designation of a role in a wireless LAN (an access point or a station, or Wi-Fi Direct), an identifier (SSID) in a wireless LAN, and designation of a role in Bluetooth (BT) (a terminal to issue an inquiry command or a terminal to stand by and respond). The start time indicates a switching timing to direct communication.

Each of the terminals having received a switching request transmits a reception confirmation to the control device 200. Each terminal initiates direct communication based on information contained in the switching request (step 912). It is noted that details of the connection method with direct communication are common in each wireless system to be used, and therefore omitted.

[Method of Switching Partner of Direct Communication Between Terminals]

As shown in FIG. 7, in a state where terminals are connected by direct communication, the number of multiple accesses between the base station 201 and a terminal can be suppressed compared to the number of terminals, thereby enabling a certain communication quality to be ensured. For example, the communication terminal 102 performing direct communication with the communication terminal 101 can be connected to a network service through the communication terminal 101.

On the other hand, the relationship of direct communication in FIG. 7 sometimes needs to be reconsidered. Such a relationship includes the direct communication between the communication terminal 101 and the communication terminal 102, the direct communication between the communication terminal 104 and the communication terminal 103, and the direct communication between the communication terminal 104 and the communication terminal 105.

It is noted that the master machine regularly reports, to the control device 200, a communication quality with other terminals which perform direct communication with the master machine itself. The master machine also regularly reports to the control device 200 a state of itself, such as a state of a remaining battery level. Furthermore, when switching between an active mode and a sleep mode has been performed, the master machine reports to the control device 200 accordingly. Alternatively, the master machine reports these pieces of information to the control device 200 in response to a regular request from the control device 200.

An example of a case where such reconsideration is required includes a case where movement of the communication terminal 103 causes the direct communication with the communication terminal 104 to be disabled. Another example of a case where the reconsideration is required includes a case where a difference of a certain value or more has been caused between the communication traffic volume of data communication through the communication terminal 101 and that through the communication terminal 104.

Specifically, data communication between the communication terminals 102, 103, and 105, each performing direct communication, and the base station passes through the communication terminal 101 and the communication terminal 104. For this reason, a load such as a consumption of a battery is larger than that of a normal terminal. Therefore, a situation where many terminals are connected to part of the terminals needs to be prevented. The control device 200 needs to monitor the communication traffic volume of data communication passing through the master machine such as the communication terminal 101 and the communication terminal 104. Then, when the communication traffic volume of a specific master machine has increased, the control device 200 needs to reconnect the terminal performing direct communication with another neighboring master machine, in order to disperse the load.

Also, an example of a case where the reconsideration is needed includes a case where the remaining battery level of the master machine has reached a certain level or less. Another example thereof includes a case where the communication quality between the master machine and the base station has reached a certain level or less. A further example of a case where the reconsideration is needed includes a case where the state of the master machine shifts from an active mode to a sleep mode.

Figure 11:
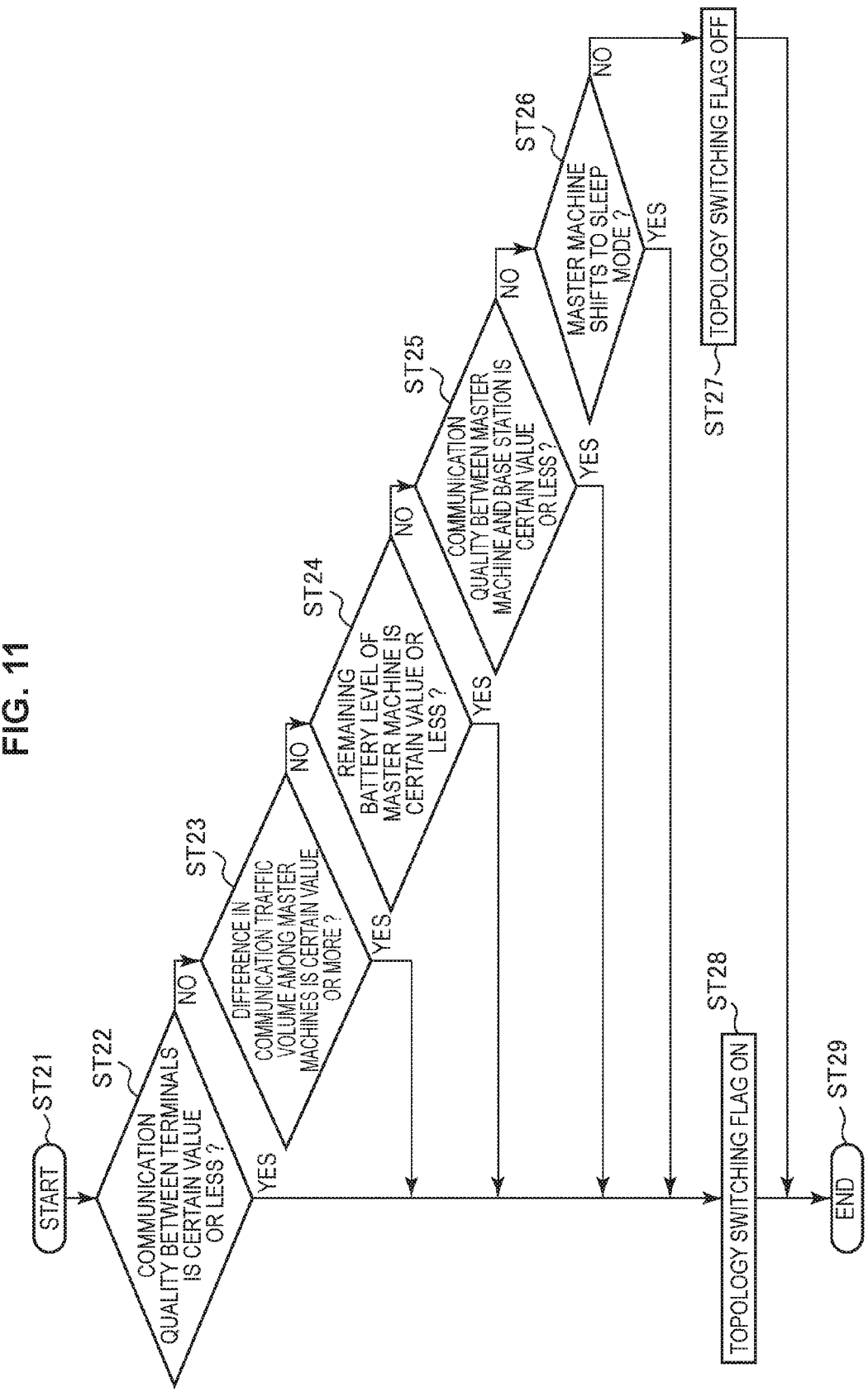
FIG. 11 is a flow chart showing an example of processing of judging whether a topology of direct communication needs to be switched in a control device.

A flow chart of FIG. 11 shows an example of processing of judging whether a topology of direct communication needs to be switched in the control device 200. It is noted that this judgment processing is periodically performed.

The control device 200 starts processing in step ST21, and thereafter proceeds to processing of step ST22. In this step ST22, the control device 200 confirms a communication quality between the terminals, which is periodically reported from the master machine, and judges whether the confirmed communication quality is a certain value or less. When the communication quality is a certain value or less, the control device 200 judges that a topology of direct communication needs to be switched. Then, the control device 200 turns on a topology switching flag in step ST28, and thereafter ends the processing in step ST29.

When the control device 200 judges in step ST22 that the communication quality is not a certain value or less, the processing proceeds to step ST23. In this step ST23, the control device 200 confirms the communication traffic volumes of data communication passing through a plurality of master machines, and judges whether there is a difference of certain value or more. When there is a difference of a certain value or more, the control device 200 judges that a topology of direct communication needs to be switched. Then, the control device 200 turns on a topology switching flag in step ST28, and thereafter ends the processing in step ST29.

When the control device 200 judges in step ST23 that there is not a difference of a certain value or more, the processing proceeds to step ST24. In this step ST24, the control device 200 judges whether the remaining battery level of the master machine is a certain value or less. When the remaining battery level is a certain value or less, the control device 200 judges that a topology of direct communication needs to be switched. Then, the control device 200 turns on a topology switching flag in step ST28, and thereafter ends the processing in step ST29.

When the control device 200 judges in step ST24 that the remaining battery level is not a certain value or less, the processing proceeds to step ST25. In this step ST25, the control device 200 judges whether the communication quality between the master machine and the base station 201 is a certain value or less. When the communication quality is a certain value or less, the control device 200 judges that a topology of direct communication needs to be switched. Then, the control device 200 turns on a topology switching flag in step ST28, and thereafter ends the processing in step ST29.

When the control device 200 judges in step ST25 that the communication quality is not a certain value or less, the processing proceeds to step ST26. In this step ST26, the control device 200 judges whether the state of the master machine has transmitted to a sleep mode. When the master machine has shifted to a sleep mode, the control device 200 judges that a topology of direct communication needs to be switched. Then, the control device 200 turns on a topology switching flag in step ST28, and thereafter ends the processing in step ST29.

When the master machine has not shifted to a sleep mode in step ST26, the control device 200 judges that a topology of direct communication does not need to be switched. Then, the control device 200 turns off a topology switching flag in step ST27, and thereafter ends the processing in step ST29.

Figure 12:
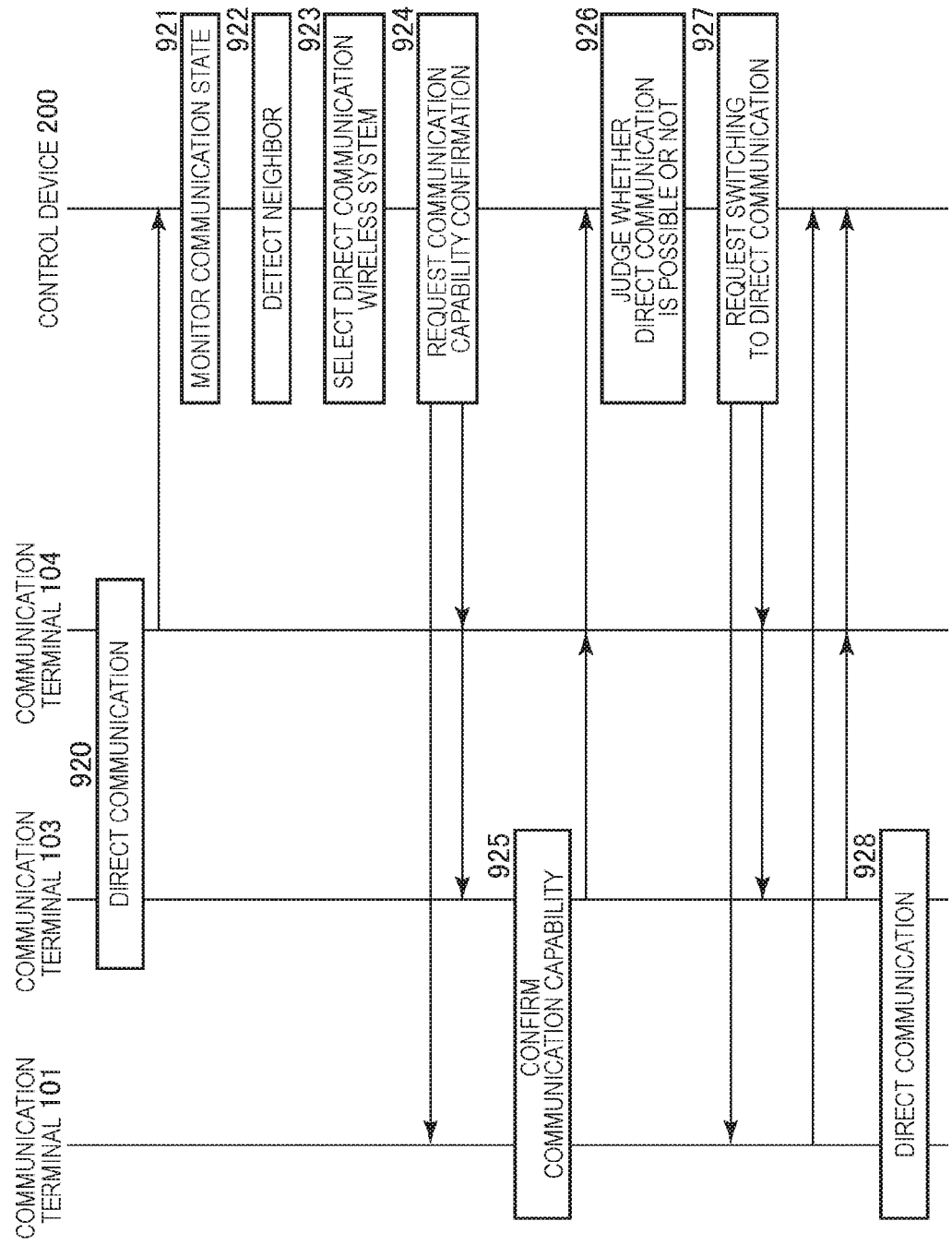
FIG. 12 is a diagram for explaining processing of switching a connection partner of direct communication.
Figure 13:
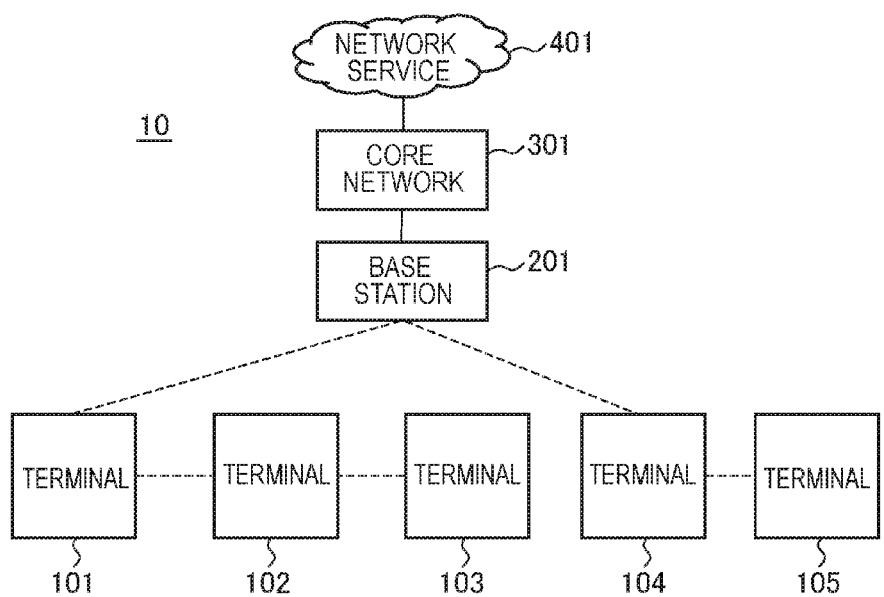
FIG. 13 is a diagram showing an example of a system structure after a topology of direct communication has been switched.

A sequence diagram of FIG. 12 shows processing of switching a connection partner of direct communication. In this example, the connection state of FIG. 7 is switched to the connection state of FIG. 13. Furthermore, in this example, for example, it is shown that the movement of the communication terminal 103 causes decrease in communication quality with the communication terminal 104, and a partner terminal of the communication terminal 103 in direct communication is switched from the communication terminal 104 to the communication terminal 101.

The communication terminal 103 and the communication terminal 104 perform direct communication, and the terminal 104 is the master machine (step 920). The communication terminal 104, which is the master machine, periodically reports, to the control device 200, the communication state (for example, received electric field intensity) with the communication terminal 103. Although not shown, another master machine also similarly reports to the control device 200.

The control device 200 monitors a state of each terminal group (step 921). Each terminal group is constituted by one master machine and a predetermined number of slave machines. For example, in FIG. 7, the communication terminals 101 and 102 constitute one terminal group, and the communication terminals 103 to 105 constitute another terminal group.

For example, the control device 200 monitors a communication state of each slave machine reported by each master machine, and a communication traffic volume of data communication passing through each master machine measured by itself (the base station 201). Here, when the control device 200 judges that the topology (state) of direct communication needs to be switched, it turns on a topology switching flag (see FIG. 11) to change the topology of direct communication. Hereinafter, there will be described, for example, an example of changing the state of direct communication of the communication terminal 103.

The control device 200 selects a neighboring terminal of the communication terminal 103 to be targeted. For example, the control device 200 selects, as a candidate terminal, a terminal connected to the same base station 201. Here, it is assumed that the communication terminal 101 has been selected as a candidate terminal. It is noted that steps 923 to 926 are similar processing to the above-described steps 904 to 907 of FIG. 5. Therefore, detailed description thereof is omitted. When the control device 200 transmits a confirmation request to the communication terminal 103 in step 924, the request is transmitted via the communication terminal 104. Also, when the communication terminal 103 reports the confirmation result of step 925 to the control device 200, the result is reported via the communication terminal 104.

It is noted that steps 927 and 928 are similar processing to the above-described steps 911 and 912 of FIG. 8. Therefore, detailed description thereof is omitted. The control device 200 transmits a switching request for the communication terminal 103 in step 927 via the communication terminal 104. Also, the communication terminal 103 transmits, to the control device 200, a reply to the request, via the communication terminal 104.

It is noted that in the processing of steps 922 to 926, when the master machine with which the communication terminal 103 can be connected does not exist, or when the communication terminal 103 is switched to communication with the base station 201, the control device 200 designates the base station 201 as a switching destination in step 927. Thus, the communication terminal 103 is switched from direct communication to communication with the base station 201.

As described above, according to the communication system 10 shown in FIG. 1, the control device 200 monitors a state of each of a predetermined number of terminal groups performing direct communication, and controls to change the structure of the terminal groups when the state comes to fail to satisfy a certain condition. This enables, for example, effective utilization and maintenance of direct communication. For example, communication can be maintained by changing the topology of direct communication responding to the movement of the communication terminal. Also, a load of a master machine is reduced by, for example, changing the topology of direct communication in accordance with the communication traffic volume of data communication passing through the master machine.

Also, in the communication system 10 shown in FIG. 1, the master machine constituting each terminal group regularly reports, to the control device 200, a communication state with each slave machine constituting the terminal group. For this reason, the control device 200, for example, can appropriately change the topology of direct communication corresponding to, for example, movement of the slave machine.

Also, in the communication system 10 shown in FIG. 1, when a request for connection with the base station 201 is received from a predetermined communication terminal, the control device 200 selects a direct communication target terminal (a predetermined communication terminal and its neighboring terminal, or only a neighboring terminal of the predetermined communication terminal), and controls the selected terminal to perform direct communication, in a case where the wireless communication capacity of the base station 201 is a certain value or more. This favorably enables, for example, mitigation of the scarcity of wireless capacity.

Also, in the communication system 10 shown in FIG. 1, when controlling a direct communication target terminal to perform direct communication, the control device 200 transmits a request for switching to direct communication to the communication terminal side, when it judges that direct communication is possible based on a confirmation result transmitted from the communication terminal side in response to a request transmitted to the terminal side to confirm whether direct communication is possible or not. Therefore, for example, a situation where communication is actually impossible when switched can be prevented from occurring, thereby allowing for favorable switching to direct communication.

Also, in the communication system 10 shown in FIG. 1, information for confirming whether direct communication is possible or not, including at least information on a direct communication wireless system and identification information of a partner terminal, is inserted in the confirmation request transmitted by the control device 200 to each terminal. Therefore, for example, each terminal can efficiently perform processing for confirming whether direct communication is possible or not, such as measurement of a received electric field intensity.

2. Variations

It is noted that although embodiments of the present technology have been described in detail with reference to the accompanying drawings, the present system is not limited to such examples. Any person having ordinary knowledge in the art to which the present technology belongs can apparently arrive at various modifications or corrections within the scope of the technological idea described in the claims. It is naturally understood that these modifications and corrections also fall in the range of the present technology. For example, the communication terminal has been described by assuming a mobile phone. However, the communication terminal is not limited to a mobile phone, and may be any portable processing device such as a PDA, a game machine, and a small PC.

Additionally, the present technology may also be configured as below.

(1)

A control device including:

a state monitoring unit that monitors a state of a predetermined number of terminal groups each including a predetermined number of first communication terminals and a second communication terminal performing direct communication with the first communication terminals while being also connected to a base station; and a group structure control unit that changes a structure of the terminal groups when the state comes to fail to satisfy a certain condition.

(2)

The control device according to (1), wherein the state monitoring unit monitors a state of the first communication terminal and/or the second communication terminal.

(3)

The control device according to (2), wherein the state monitoring unit monitors a state of direct communication between the first communication terminal and the second communication terminal, and the group structure control unit changes the structure of the terminal groups when a communication quality of direct communication between the first communication terminal and the second communication terminal reaches a certain value or less.

(4)

The control device according to (2) or (3), wherein the state monitoring unit monitors a remaining battery level of the second communication terminal, and the group structure control unit changes the structure of the terminal groups when the remaining battery level of the second communication terminal reaches a certain value or less.

(5)

The control device according to any of (2) to (4), wherein the state monitoring unit monitors a state of communication between the second communication terminal and the base station, and the group structure control unit changes the structure of the terminal groups when a quality of communication between the second communication terminal and the base station reaches a certain value or less.

(6)

The control device according to any of (2) to (5), wherein the state monitoring unit monitors which of an active mode and a sleep mode a mode of the second communication terminal is, and the group structure control unit changes the structure of the terminal groups when the second communication terminal has shifted from the active mode to the sleep mode.

(7) The control device according to any of (1) to (6), wherein the state monitoring unit monitors a communication traffic volume of data communication passing through the second communication terminal in each of the predetermined number of terminal groups, and the group structure control unit changes the structure of the terminal groups when a difference of a certain value or more is caused between the communication traffic volumes of the predetermined number of terminal groups.

(8)

A base station including:

a communication unit that wirelessly performs communication with a communication terminal; and a control unit that controls wireless communication through the communication unit, wherein the control unit monitors a state of a predetermined number of terminal groups each including a predetermined number of first communication terminals and a second communication terminal performing direct communication with the first communication terminals while being also connected to the base station, and changes a structure of the terminal groups when the state comes to fail to satisfy a certain condition.

(9)

A communication terminal including:

a first communication unit that wirelessly performs direct communication with another communication terminal;

a second communication unit that performs wireless communication with a base station; and a control unit that controls wireless communication through the first communication unit and the second communication unit, wherein the control unit reports a communication state with the another communication terminal performing direct communication by the first communication unit, to a control device through the second communication unit.

(10)

A control device including:

a connection request receiving unit that receives, from a first communication terminal, a request for connection with a base station;

a judging unit that judges whether a wireless communication capacity of the base station is a certain value or more when the connection request is received; and a control unit that controls direct communication target terminals, which include the first communication terminal and a second communication terminal neighboring to the first communication terminal, or the second communication terminal neighboring to the first communication terminal, to perform direct communication when the wireless communication capacity of the base station is judged to be the certain value or more.

(11)

The control device according to (10), wherein the control unit includes a terminal selecting unit that selects a candidate terminal that becomes a candidate for the second communication terminal, a confirmation request transmitting unit that transmits, to each of the direct communication target terminals, a request to confirm whether direct communication is possible or not, a confirmation result receiving unit that receives a confirmation result from part or all of the direct communication target terminals, a judging unit that judges, based on the confirmation result, whether each of the direct communication target terminals is capable of direct communication, and a switching request transmitting unit that, when direct communication is judged to be possible, transmits a request for switching to direct communication to each of the direct communication target terminals.

(12)

The control device according to (11), wherein the terminal selecting unit selects, as the candidate terminal, a communication terminal being connected to the base station with which the first communication terminal requests for connection.

(13)

The control device according to (11), wherein the terminal selecting unit selects, as the candidate terminal, a communication terminal that is connected to the base station with which the first communication terminal requests for connection and that has been already performing direct communication with another communication terminal.

(14)

The control device according to any of (11) to (14), wherein the terminal selecting unit selects the candidate terminal in a manner that the direct communication target terminals have a common direct communication wireless system.

(15)

The control device according to any of (11) to (14), wherein information for confirming whether the direct communication is possible or not is inserted into the confirmation request transmitted by the confirmation request transmitting unit, the information including at least information on a direct communication wireless system and identification information of a partner terminal.

(16)

The control device according to any of (11) to (15), wherein at least information on a direct communication wireless system and identification information of a partner terminal are included in the switching request transmitted by the switching request transmitting unit.

(17)

The control device according to any of (11) to (16), further including a master machine determining unit that determines a master machine which is also concurrently connected with the base station among the direct communication target terminals, when the judging unit judges that direct communication is possible, wherein information on the determined master machine is included in the switching request transmitted by the switching request transmitting unit.

(18)

A control device including:

a confirmation request transmitting unit that transmits, to a plurality of direct communication target communication terminals, a request to confirm whether direct communication is possible or not;

a confirmation result receiving unit that receives a confirmation result from part or all of the plurality of direct communication target communication terminals;

a judging unit that judges, based on the confirmation result, whether the plurality of direct communication target communication terminals can perform direct communication or not; and a switching request transmitting unit that transmits, to the plurality of direct communication target communication terminals, a request for switching to direct communication, when direct communication is judged to be possible.

REFERENCE SIGNS LIST 10 communication system
100, 101 to 105 communication terminal
200 control device
201 base station
301 core network
401 network service
601 to 603 communication unit
604 control unit
701 communication unit
702 control unit
703 database

The invention claimed is:

1. A control device, comprising:
 a state monitoring unit configured to:
  monitor a group state of at least one terminal group that includes at least one first communication terminal and a second communication terminal, wherein the second communication terminal communicates directly with the at least one first communication terminal and is also connected to a base station; and
  monitor a first state of the at least one first communication terminal, a second state of the second communication terminal, and a remaining battery level of the second communication terminal; and
 a group structure control unit configured to change a structure of the at least one terminal group based on a determination that the group state fails to satisfy a certain condition, wherein the structure of the at least one terminal group is changed based on a change in topology of direct communication between the at least one first communication terminal and the second communication terminal, and wherein the structure of the at least one terminal group is changed further based on the remaining battery level of the second communication terminal that is equal to or less than a first certain value.

2. The control device according to claim 1,
wherein the state monitoring unit is further configured to monitor a third state of the direct communication between the at least one first communication terminal and the second communication terminal, and
the group structure control unit is further configured to change the structure of the at least one terminal group based on a communication quality of the direct communication between the at least one first communication terminal and the second communication terminal that reaches a second certain value or less.

3. The control device according to claim 1,
wherein the state monitoring unit is further configured to monitor a fourth state of communication between the second communication terminal and the base station, and
the group structure control unit is further configured to change the structure of the at least one terminal group based on a quality of communication between the second communication terminal and the base station that reaches a third certain value or less.

4. The control device according to claim 1,
wherein the state monitoring unit is further configured to monitor an active mode and a sleep mode of the second communication terminal, and
the group structure control unit is further configured to change the structure of the at least one terminal group based on a shift of the second communication terminal from the active mode to the sleep mode.

5. The control device according to claim 1,
wherein the state monitoring unit is further configured to monitor a communication traffic volume of data communication that passes through the second communication terminal in each of a determined number of terminal groups, and
the group structure control unit is further configured to change the structure of the at least one terminal group based on a difference that is equal to or greater than a fourth certain value is measured between the communication traffic volume of each of the determined number of terminal groups.

6. A base station, comprising:
a communication unit configured to wirelessly communicate with a communication terminal; and
a control unit configured to:
  control the wireless communication via the communication unit,
  monitor a group state of at least one terminal group, wherein the at least one terminal group includes at least one first communication terminal and a second communication terminal, wherein the second communication terminal communicates directly with the at least one first communication terminal and is also connected to the base station,
  monitor a first state of the at least one first communication terminal, a second state of the second communication terminal, and a remaining battery level of the second communication terminal, and
  change a structure of the at least one terminal group based on a determination that the group state fails to satisfy a certain condition, wherein the structure of the at least one terminal group is changed based on a change in topology of direct communication between the at least one first communication terminal and the second communication terminal, and wherein the structure of the at least one terminal group is changed further based on the remaining battery level of the second communication terminal that is equal to or less than a certain value.

7. A first communication terminal, comprising:
a first communication unit configured to communicate wirelessly in a direct communication with a second communication terminal;
a second communication unit configured to wirelessly communicate with a base station; and
a control unit configured to:
  control wireless communication through the first communication unit and the second communication unit, and
  report a state of the direct communication between the second communication terminal and the first communication unit, to a control device via the second communication unit, wherein a topology of direct communication between the first communication terminal and the second communication terminal is changed based on the state of the direct communication, wherein a structure of a terminal group that includes the first communication terminal and the second communication terminal is changed based on a remaining battery level of the second communication terminal that is equal to or less than a certain value.

8. A control device, comprising:
a connection request receiving unit configured to receive, from a first communication terminal, a connection request for connection with a base station;
a first judging unit configured to judge that a wireless communication capacity of the base station is a certain value or more at a time the connection request is received;
a control unit configured to control direct communication target terminals such that the direct communication target terminals communicate directly with each other based on a determination that the wireless communication capacity of the base station is more than the certain value, wherein the direct communication target terminals include the first communication terminal and a second communication terminal that is in neighborhood of the first communication terminal;
a second judging unit configured to judge, based on a confirmation result, that each of the direct communication target terminals is capable of direct communication among the direct communication target terminals;
a switching request transmitting unit configured to transmit, based on a determination that the direct communication is possible, a switching request to switch to the direct communication to each of the direct communication target terminals; and
a master machine determining unit configured to determine a master machine which is concurrently connected with the base station among the direct communication target terminals, based on the second judging unit that judges that the direct communication is possible, wherein information on the determined master machine is included in the switching request transmitted by the switching request transmitting unit.

9. The control device according to claim 8, wherein the control unit includes:
a terminal selecting unit configured to select a candidate terminal that becomes a candidate for the second communication terminal;
a confirmation request transmitting unit configured to transmit, to each of the direct communication target terminals, a confirmation request to confirm that the direct communication is possible; and
a confirmation result receiving unit configured to receive the confirmation result from part or all of the direct communication target terminals.

10. The control device according to claim 9, wherein the terminal selecting unit is further configured to select, as the candidate terminal, a communication terminal that is connected to the base station with which the first communication terminal requests for connection.

11. The control device according to claim 9, wherein the terminal selecting unit is further configured to select, as the candidate terminal, a communication terminal that is connected to the base station with which the first communication terminal requests for connection.

12. The control device according to claim 9, wherein the terminal selecting unit is further configured to select the candidate terminal such that, the direct communication target terminals have a same direct communication wireless system.

13. The control device according to claim 9, wherein information which confirms that the direct communication is possible is inserted into the confirmation request transmitted by the confirmation request transmitting unit.

14. A control device, comprising:
a confirmation request transmitting unit configured to transmit, to a plurality of direct communication target communication terminals, a request to confirm that direct communication is possible;
a confirmation result receiving unit configured to receive a confirmation result from part or all of the plurality of direct communication target communication terminals;
a first judging unit configured to judge that a wireless communication capacity of a base station is equal to or more than a certain value at a time at which connection request to connect to the base station is received;
a second judging unit configured to judge, based on the confirmation result, that the plurality of direct communication target communication terminals are capable of the direct communication; and
a switching request transmitting unit configured to transmit, to the plurality of direct communication target communication terminals, a switching request for switching to the direct communication, based on the direct communication that is judged to be possible; and
a master machine determining unit configured to determine a master machine which is also concurrently connected with the base station among the plurality of direct communication target communication terminals, based on the second judging unit that judges that the direct communication is possible, wherein information on the determined master machine is included in the switching request transmitted by the switching request transmitting unit.

* * * * *